June 29, 1943.  V. O. BEAM  2,322,911
VALVE MECHANISM
Filed Sept. 23, 1942
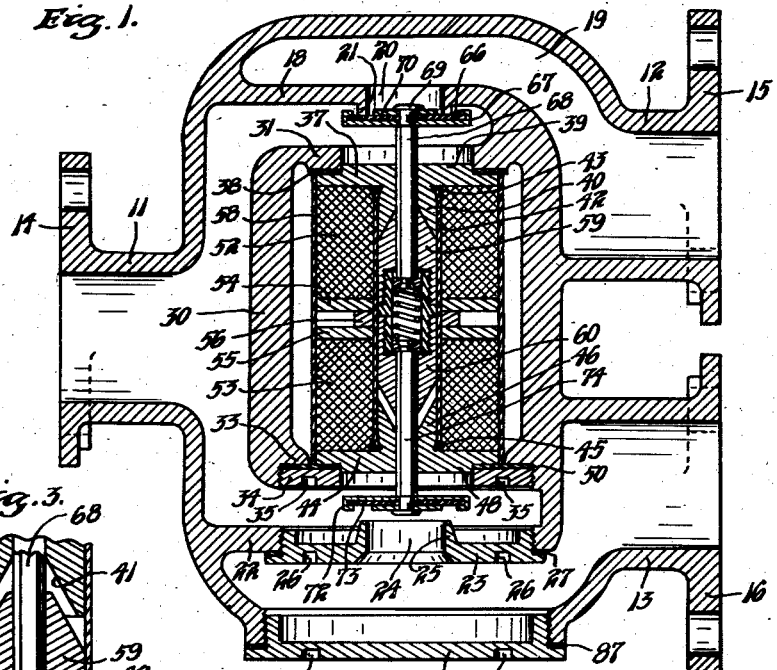
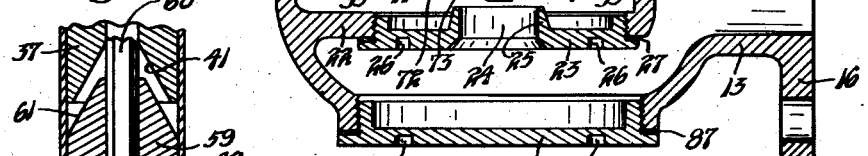
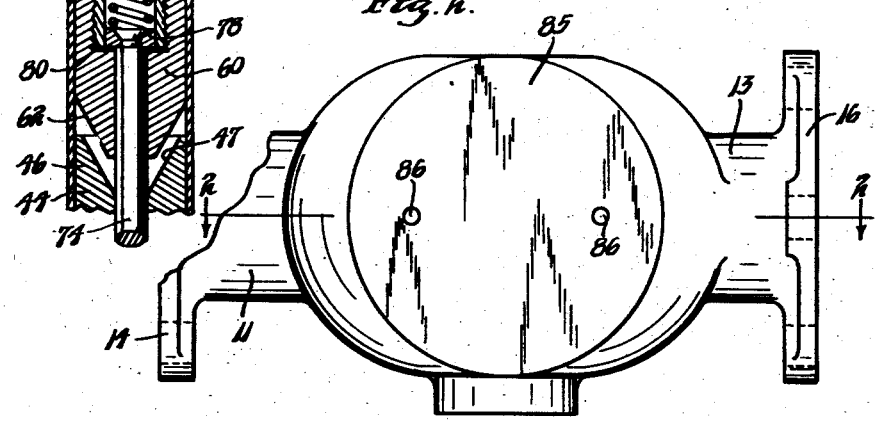
INVENTOR.
VILYNN O. BEAM
BY
George H. Fisher
ATTORNEY Patented June 29, 1943

2,322,911

UNITED STATES PATENT OFFICE 2,322,911

VALVE MECHANISM

Vilynn O. Beam, Minneapolis, Minn., assignor to Minneapolis-Honeywell Regulator Company, Minneapolis, Minn., a corporation of Delaware Application September 23, 1942, Serial No. 459,379

12 Claims. (Cl. 137—144)

The present invention is concerned with a valve mechanism and more particularly with one employing an electromagnetic valve actuating mechanism.

An object of the present invention is to provide an improved valve mechanism of the type having a first valve opening and second and third openings adapted to be selectively connected with the first opening in which a pair of valve members are provided between the first opening and the second and third openings with electromagnetic means for selectively closing one or the other of said two valve members.

A further object of the present invention is to provide a valve mechanism of the type set forth in the previous object in which provision is made for insuring against the simultaneous closure of both valve members.

A still further object of the present invention is to provide a valve mechanism of the type referred to in the previous objects in which provision is made for removing the entire electromagnetic operating unit and valve members from the valve casing.

Another object of the present invention is to provide such an arrangement in which the electromagnetic operating mechanism is thoroughly sealed from the fluid passing through the valve.

A still further object of the present invention is to provide a solenoid valve mechanism in which a single spring serves as a strain release spring in the connections of two oppositely disposed valve stems to their respective solenoid cores.

Other objects of the invention will be apparent from a consideration of the accompanying specification, claims and drawing of which Figure 1 is a horizontal sectional view of my improved valve assembly, the section being taken along the line 2—2 of Figure 2, Figure 2 is an elevational view of my valve assembly, and Figure 3 is a detailed view on a somewhat larger scale of the means for connecting the valve stem to the solenoid cores.

Referring to the drawings, the valve assembly is housed within a valve casing having an outlet portion 11 and two inlet portions 12 and 13. The outlet portion 11 is provided with a flange 14 and the inlet portions 12 and 13 with flanges 15 and 16. Flanges 14, 15 and 16 are provided in any conventional manner with apertures for the reception of bolts for securing the valve seats to associated apparatus. In one contemplated application of the valve mechanism, it controls the flow of gasoline fuel from either of two fuel tanks in an airplane to the intake manifold. In such a case, the flanges 15 and 16 are attached to conduits leading to the fuel tanks while the flange 14 is secured to the manifold.

The central portion of the valve is enlarged to provide fluid passages and a chamber for the operating mechanism. Extending between the inlet connection 12 and the upper left-hand portion of the enlarged center portion of the valve casing is a partition wall 18. This partition wall is separated from the outer wall of the valve casing to form an inlet passage 19. An aperture 20 extends through the partition wall 18 and is surrounded at its lower end by a valve seat 21.

A partition wall 22 also extends between the inlet connection 13 and the lower left-hand part of the central enlarged portion. Partition wall 22 is provided with a removable circular section 23 threadedly secured to the partition wall about the same center line as that of valve opening 20 previously referred to. The removable section 23 is provided with a valve opening 24, also having a common center line with opening 20. Surrounding the opening 24 is an upwardly extending portion 25 constituting a second valve seat. Recesses 26 extend into the lower surface of the section 23 to facilitate the removal of the section. A gasket 27 is located between the partition wall and a flange of the removable section 23 and acts to seal thoroughly the connection between section 23 and the partition wall.

The casing is provided with an enlarged central portion with a cylindrical wall 30 forming a central cylindrical chamber. This chamber is designed to house the electromagnetic actuating mechanism for the valve. The upper end of wall 30 terminates in an inwardly directed flange 31. The lower end of the wall 30 is formed with an inwardly directed flange 33 and is threaded to receive a retaining ring 34. The retaining ring 34 is of the same diameter as the removable section 23 of partition wall 22 and is threaded in the same manner so as to be removable through the opening provided by the removable section 23. The retaining ring 34 is provided with openings 35 in its lower surface to permit the turning of the retaining ring by a wrench.

A combined end plate and core stop member 37 is seated against the upper flange 31. A sealing washer 38 is interposed between the member 37 and the flange 31. The upper portion of the member 37 is provided with a reduced cylindrical portion 39 of the same diameter as the opening surrounded by flange 31. This reduced cylindrical portion 39 serves to center member 37 with respect to the chamber formed by wall 30. The lower end of member 37 is in the form of a cylinder 40 of considerable smaller diameter than the rest of the member. This portion 40 constitutes a core stop at the upper end of the solenoid assembly. This core stop is provided with a conical recess 41 (Figure 3) to cause the pull to be more uniform, as is conventional in the direct current solenoid art. The upper end of a bobbin tube 42 of brass or similar non-magnetic material is secured over the core stop 40. At its extreme upper end, the bobbin tube 42 is crimped into an annular recess of the core stop 40 and is soldered to the core stop as indicated at 43. The bobbin tube 42 is secured to a second combined end washer and core stop member 44 at its lower end. The tube 42 is crimped into an annular recess of the core stop portion of member 44 and is soldered thereto as indicated at 45. The member 44 is identical to member 37. Thus, it has a cylindrical core stop portion 46 having a conical recess 47. (Figure 3). It is also provided with a downwardly extending cylindrical portion 48 of a diameter to fit into the circular opening of retaining ring 34. A gasket 50 is interposed between the retaining ring 34 and member 44.

It will be noted that members 37 and 44 together with the wall 30, the retainer ring 34, and gaskets 38 and 50 form a fluid tight chamber sealed from any contact with the fluid passing through the valve casing. It is within this chamber that the electrical windings of the solenoid operating mechanism are located. These windings consist of two coils 52 and 53 mounted upon the bobbin tube 42. Disposed adjacent the innermost ends of coils 52 and 53 are two end washers 54 and 55 of suitable magnetic material. A further washer 56 of non-magnetic material such as aluminum is located between the two washers 54 and 55 to space these two washers apart and to separate them magnetically. Surrounding the entire core assembly is a cylindrical sleeve 58 of magnetic material. Slidably secured in the bobbin tube 42 are a pair of solenoid cores 59 and 60. These cores are best shown in Figure 3. Core 59 is provided with a conical end 61 adapted to fit within the conical recess 41. Similarly, core 60 is provided with a conical end 62 adapted to fit within the conical recess 47 of core stop 44. These two core members 59 and 60 are threadedly secured to a sleeve 64 of non-magnetic material. Sleeve 64 has a collar 65, extending btween the two core members 59 and 60, serving to separate the two core members magnetically from each other. The entire assembly comprising core members 59 and 60 and sleeve 64 move together as a unitary solenoid core assembly within the bobbin tube 42.

Referring again to Figure 1, a valve seat disk 66 is secured within a retainer disk 67. The retainer disk 67 is secured to a valve stem 68. The valve stem 68 is reduced at its upper end so as to extend through aligned openings in the retainer disk 67 and seating disk 66. The retainer disk rests on the shoulder of the valve stem 68 adjacent its reduced upper end. The uppermost end of the valve stem 68 is peened over as at 69 to retain the retainer disk and seating disk of the valve in position on the valve stem 68. A washer 70 is interposed between the peened end 69 and the seating disk 66. It is to be noted that the seating disk 66 is designed to seat on the valve seat 21. A second valve seating disk 73 adapted to seat on the valve seat 25 is secured within a retainer disk 72 which in turn is secured to a valve stem 74. The manner in which retainer disk 72 and valve seating disk 73 are secured to valve stem 74 is identical to that described in connection with retainer disk 67 and valve stem 68 and need not be repeated.

Referring again to Figure 3, the innermost ends of valve stems 68 and 74 extend into the sleeve 64. Secured to these innermost ends are collars 77 and 78, respectively. These collars are of the same diameter as the cylindrical passage within the sleeve 64 so as to be freely slidable within the sleeve. The collars, however, limit the outward movement of valve stems 68 and 74 to the position shown in Figure 3 in which they are in engagement with washers 79 and 80 which are interposed between the ends of sleeve 64 and the cores 59 and 60. A spring 82 is located within the cylindrical recess of sleeve 64 and bears at its opposite end against the washers 77 and 78 secured to the ends of valve stems 68 and 74. The spring 82 serves to bias valve stems 68 and 74 to their outermost positions shown in Figure 3. Because of the spring 82, either valve stem 68 or 74 can move inwardly against the action of spring 82 as shown in connection with valve stem 68 in Figure 1. The spring 82 thus serves as an element of a strain release connection between valve stems 68 and 69 and their respective cores. Because of the strain release connection, it is possible for either core to move into direct engagement with its associated core stop and at the same time provide firm seating of the associated valve seating disk with its valve seat.

As best indicated in Figure 1, the valve stems 68 and 74 are of such length that when they are in the position shown in Figure 3, the valve seating disks 66 and 73 are spaced apart a distance considerably less than the distance between the valve seats themselves. Thus, it is impossible for the valve seating disks both to be engaged with their respective valve seats at the same time. This is very important in certain applications of the valve where it is always desired to maintain communication between the outlet and one of the two inlets at all times.

Referring briefly to the operation of the mechanism described so far, the coils 52 and 53 are associated with the cores 59 and 60, respectively. These coils are selectively energized so as to move either core 59 or core 60, depending upon which coil is energized, into engagement with its associated core stop. Thus, when coil 52 is energized, magnetic flux flows through the flux path including core 59, washer and core stop member 41, the magnetic sleeve 58 and magnetic end washer 54. As in any such magnetic circuit, the solenoid core 59 moves in a direction to decrease the reluctance of this flux path, or in other words, into engagement with the core stop portion 40. Due to the conical recess and conical extremity, the reduction in the amount of the air gap is gradual so as to cause a more uniform pull to be exerted on the solenoid core throughout its range of movement. With core 59 in engagement with core stop 40, the seating disk 66 is engaged with the valve seat 21 and seating disk 73 is separated from its associated valve seat 25.

When, on the other hand, coil 53 is energized, magnetic flux flows through the path including the core 60, the combined end washer and core stop member 44, the magnetic sleeve 58, and end washer 55. As a result of flux flowing through this circuit, the core 60 moves into engagement with the core stop member 44 so that seating washer 73 is seated against valve seat 25 and seating washer 66 is separated from valve seat 21. Where, as suggested above, the valve is used for the control of the flow of fuel from either of two gasoline tanks to the carburetor in an airplane, when solenoid coil 52 is energized, gas may flow from the tank connected with inlet 13 through the valve opening 24 and out through outlet 11. When, on the other hand, solenoid coil 52 is energized, communication is established between the gas tank connected to inlet 12 and outlet 11 through the opening 20.

A very important feature of the present invention is the ease with which the various elements may be assembled and disassembled. As noted above, provision is made for removing the entire valve assembly including the operating mechanism therefor from one end of the valve casing. Attention has been previously directed to the retaining ring 34 and the removable section 23 of partition wall 22. A circular closure plug 85 is secured within the lower portion of the valve casing. The closure plug 85, the removable section 23, the retainer ring 34 and the entire valve assembly all are disposed about a common center line. The closure plug 85 is provided with recesses 86 to accommodate the lugs of a wrench. The gasket 87 is located between the valve casing 87 and the flange of the closure plug 85. The closure plug 85 is slightly larger in diameter than either the removable section 23 or the retainer ring 34. Thus, upon removal of the closure plug 85, both the removable section 23 and the retainer ring 34 can be removed from the opening into which the closure plug 85 normally fits. Since the valve seat retainer disk 67 is slightly smaller in diameter than the opening surrounded by flange 31 and since the cylindrical magnetic sleeve 58 surrounding the coils 52 and 53 is slightly less in diameter than the opening surrounded by flange 33, the entire solenoid and valve assembly can be withdrawn through the opening provided by the removal of the retainer ring. Since the opening provided by the removal of section 23 in the opening is the same in size, or slightly larger, the solenoid and valve assembly can likewise be withdrawn through this opening. Since the opening provided by the removal of closure plug 85 is even larger, the elements can be freely drawn through this opening. It will be thus seen that the entire solenoid and valve assembly can be withdrawn from one end of the valve casing. This permits the ready repair of any of the elements of the assembly. Furthermore, this permits the assembly of all the movable elements of the assembly outside of the valve casing where they can be most conveniently assembled. The entire unit is then inserted within the valve casing and is clamped in position by the application of retainer ring 34. The removable section 23 is then placed in position and finally the closure plug 83 is screwed into position.

It will be seen that I have provided an extremely compact and simply assembled valve mechanism in which provision is made for connecting one opening with either of two other openings and in which provision is made for insuring that the first opening is always connected with one of the other openings. Furthermore, it will be seen that the valve assembly can be readily assembled or repaired conveniently at any time.

While I have shown a specific embodiment of my invention, it is to be understood that this is for purposes of illustration and that my invention is to be limited only by the scope of the appended claims.

I claim as my invention:

1. An electromagnet valve assembly comprising a valve casing having a plurality of openings for the passage of fluid therethrough, a plurality of valve seats all of which communicate with a first of said openings and each of which communicates with a different one of the other of said openings, a plurality of valve members, each cooperating with one of said valve seats, said housing having a chamber disposed between said valve members, electromagnetic operating mechanism for said valve members disposed in said chamber, said electromagnetic mechanism comprising electrical windings, and means for sealing said windings against the fluid passing through said valve casing.

2. An electromagnet valve assembly comprising a valve casing having three openings for the passage of fluid therethrough, a pair of opposed valve seats both of which communicate with a first of said openings and each of which communicates with a different one of the other two of said openings, a pair of valve members, each cooperating with one of said valve seats, said housing having a chamber disposed between said valve members, and electromagnetic operating mechanism for said valve members disposed in said chamber.

3. An electromagnet valve assembly comprising a valve casing having three openings for the passage of fluid therethrough, a pair of opposed circular valve seats having a common center line, both of which valve seats communicate with a first of said openings and each of which communicates with a different one of the other two of said openings, a pair of circular valve members, each cooperating with one of said valve seats, said housing having a chamber disposed between said valve members, electromagnetic operating mechanism for said valve members disposed in said chamber, said electromagnetic mechanism comprising electrical windings, and means for sealing said windings against the fluid passing through said valve assembly.

4. An electromagnet valve assembly comprising a valve casing having three openings for the passage of fluid therethrough, a pair of opposed valve seats both of which communicate with a first of said openings and each of which communicates with a different one of the other two of said openings, a pair of valve members, each cooperating with one of said valve seats, means operatively connecting said valve members together so as to prevent the simultaneous engagement of both valve members with their associated valve seats, said housing having a chamber disposed between said valve members, and electromagnetic operating mechanism for said valve members disposed in said chamber.

5. A solenoid valve assembly comprising a valve casing having three openings for the passage of fluid therethrough, a pair of opposed valve seats both of which communicate with a first of said openings and each of which communicates with a different one of the other two of said openings, a pair of valve members, each cooperating with one of said valve seats, said housing having a chamber disposed between said valve members, a pair of solenoid windings sealed within said chamber and having aligned openings therethrough, a solenoid core assembly movably disposed in said openings, and a pair of valve stems, one secured to each valve member and to said solenoid core assembly.

6. A solenoid valve assembly comprising a valve casing having three openings for the passage of fluid therethrough, a pair of opposed valve seats both of which communicate with a first of said openings and each of which communicates with a different one of the other two of said openings, a pair of valve members, each cooperating with one of said valve seats, said housing having a chamber disposed between said valve members, a pair of solenoid windings sealed within said chamber and having aligned openings therethrough, a solenoid core assembly movably disposed in said openings, a valve stem secured to each valve member and extending from opposite directions into said solenoid core assembly, and one-way strain release means for connecting said valve stems to said solenoid core assembly so as to permit said valve stems to move inwardly but so as to limit the outward movement of said valve members to prevent the simultaneous engagement of both valve members with their seats.

7. A solenoid valve assembly comprising a valve casing having three openings for the passage of fluid therethrough, a pair of opposed valve seats both of which communicate with a first of said openings and each of which communicates with a different one of the other two of said openings, a pair of valve members, each cooperating with one of said valve seats, said housing having a chamber disposed between said valve members, a pair of solenoid windings sealed within said chamber and having aligned openings therethrough, a solenoid core assembly movably disposed in said openings, a valve stem secured to each valve member and extending from opposite directions into said solenoid core assembly, a spring within said solenoid core assembly biasing said valve stems and hence said valve members outwardly in the direction of their valve seats, and means for limiting the outward movement of said valve members so as to prevent the simultaneous engagement of both valve members with their seats.

8. A solenoid valve assembly comprising a valve casing having three openings for the passage of fluid therethrough, a pair of opposed valve seats both of which communicate with a first of said openings and each of which communicates with a different one of the other two of said openings, a pair of valve members, each cooperating with one of said valve seats, said housing having a chamber disposed between said valve members, a pair of solenoid windings sealed within said chamber and having aligned openings therethrough, a pair of solenoid cores movably disposed in said openings, a non-magnetic sleeve mechanically connecting said cores together but maintaining said cores magnetically separated, a valve stem secured to each valve member and extending through its respective core, a spring within said sleeve biasing said valve stems and hence said valve members outwardly in the direction of their valve seats, and means for limiting the outward movement of said valve members so as to prevent the simultaneous engagement of both valve members with their seats.

9. An electromagnetic valve assembly comprising a valve casing having three openings for the passage of fluid therethrough, said casing further having a wall forming a central chamber, a partition wall extending between a first of said openings and a second of said openings and having a removable section with a valve seat therein, said casing being provided with a further valve seat disposed between said first opening and the third of said openings, said last-named seat being disposed on the opposite side of said central chamber from said first-named valve seat, a pair of valve members, each cooperating with one of said valve seats, electromagnetic operating mechanism for said valve members located within said central chamber, a removable retaining member adjacent said removable section of said partition wall for retaining said electromagnetic mechanism in said chamber, and a removable section in the outer wall of said casing adjacent said retaining member and removable section of said partition wall, the size of said electromagnetic mechanism and valve members with respect to said retaining member and removable sections of the casing and partition wall being such that upon removal of said retaining member and said removable sections, said electromagnetic mechanism and valve members can be removed as a unit from said casing.

10. An electromagnetic valve assembly comprising a valve casing having three openings for the passage of fluid therethrough, said casing further having a wall forming a central cylindrical chamber, a partition wall extending between a first of said openings and a second of said openings and having a removable circular section with a valve seat therein, said casing being provided with a further valve seat disposed between said first opening and the third of said openings, said last-named seat being disposed on the opposite side of said central chamber from said first-named valve seat and having a common center line therewith, a pair of valve members, each cooperating with one of said valve seats, cylindrical electromagnetic operating mechanism for said valve members located within said central cylindrical chamber, a removable circular retaining member adjacent said removable section of said partition wall for retaining said electromagnetic mechanism in said chamber, and a removable circular section in the outer wall of said casing adjacent said retaining member and removable section of said partition wall, said electromagnetic mechanism, said valve members, said retaining member, and said removable sections of said partition wall and casing having a common center line and the size of said electromagnetic mechanism and valve members with respect to said retaining member and removable sections of the casing and partition wall being such that upon removal of said retaining member and said removable sections, said electromagnetic mechanism and valve members can be removed as a unit from said casing.

11. An electromagnetic valve assembly comprising a valve casing having three openings for the passage of fluid therethrough, said casing further having a wall forming a central chamber, a partition wall extending between a first of said openings and a second of said openings and having a removable section with a valve seat therein, said casing being provided with a further valve seat disposed between said first opening and the third of said openings, said last-named seat being disposed on the opposite side of said central chamber from said first-named valve seat, a pair of valve members, each cooperating with one of said valve seats, a pair of solenoid coils having aligned openings located within said central chamber, a removable retaining member adjacent said removable section of said partition wall for retaining said solenoid coils sealed in said chamber, a pair of solenoid cores slidably mounted within the openings of said coils, each of said cores being connected to one of said valve members, and a removable section in the outer wall of said casing adjacent said retaining member and removable section of said partition wall, the size of said solenoid coils and valve members with respect to said retaining member and removable sections of the casing and partition wall being such that upon removal of said retaining member and said removable sections, said solenoid coils and cores and said valve members can be removed as a unit from said casing.

12. An electromagnetic valve assembly comprising a valve casing having three openings for the passage of fluid therethrough, said casing further having a wall forming a central open ended chamber, a partition wall extending between a first of said openings and a second of said openings and having a removable section with a valve seat therein, said casing being provided with a further valve seat disposed between said first opening and the third of said openings, said last-named seat being disposed on the opposite side of said central chamber from said first-named valve seat, a pair of valve members, each cooperating with one of said valve seats and each being of a size slightly less than the end openings of said central chamber, a pair of solenoid coils having aligned openings located within said central chamber, a washer of magnetic material adjacent the outer end of one of said coils and closing one end opening of said chamber, a washer of magnetic material adjacent the outer end of the other coil, a removable retaining member cooperating with said last-named washer to retain said electromagnetic mechanism in said chamber and to close the other open end of said chamber, a pair of solenoid cores slidably mounted within the openings of said coils, each of said cores being connected to one of said valve members, and a removable section in the outer wall of said casing adjacent said retaining member and said removable section of said partition wall, the size of said solenoid coils with respect to said retaining member and removable sections of the casing and partition wall being such that upon removal of said retaining member and said removable sections, said solenoid coils and cores and said valve members can be removed as a unit from said casing.

VILYNN O. BEAM.